Figure 1:
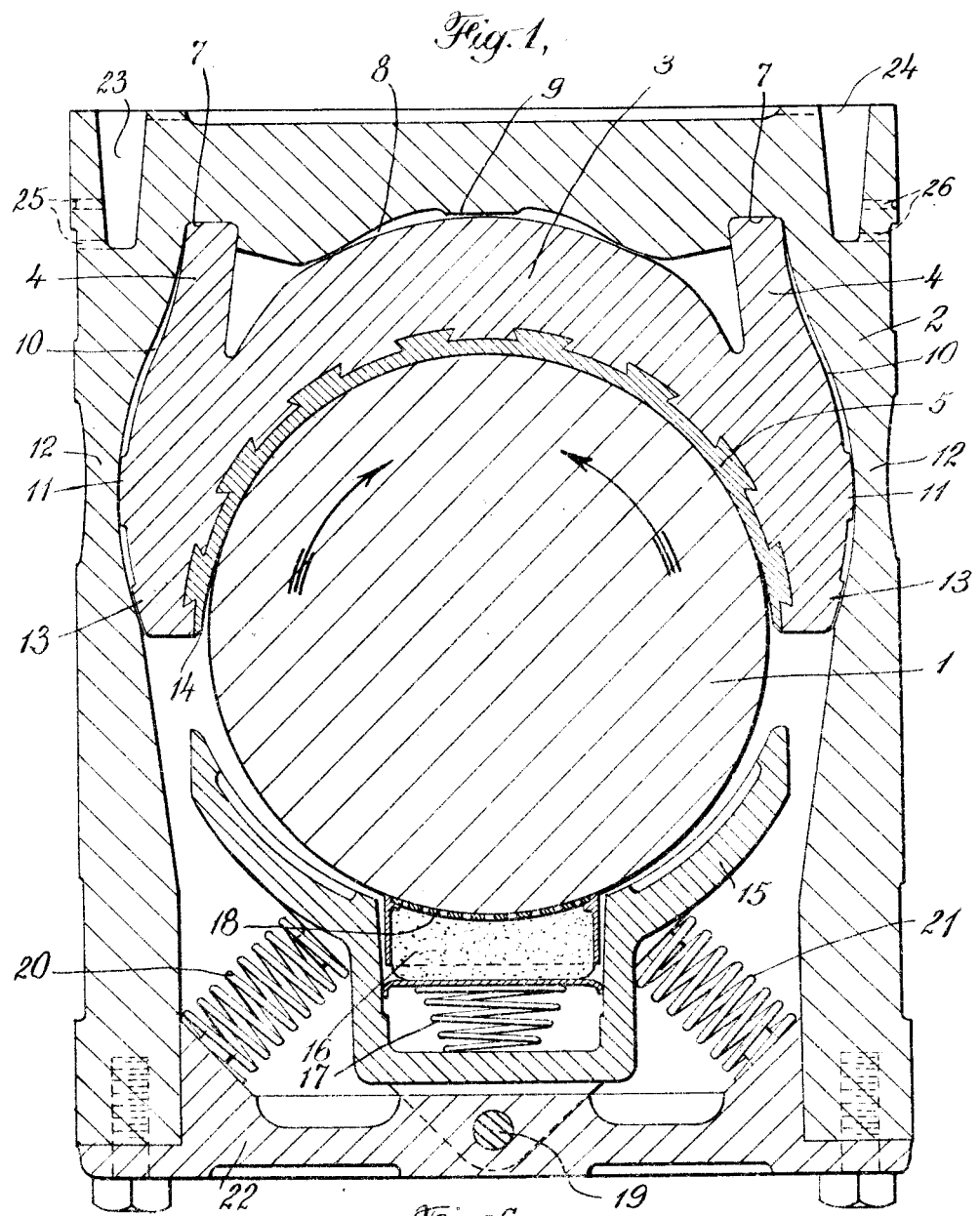

April 3, 1928.  1,664,880

G. FLINTERMANN

JOURNAL BEARING

Filed Dec. 24, 1926  2 Sheets-Sheet 1

INVENTOR
Gerhard Flintermann
BY
ATTORNEYS

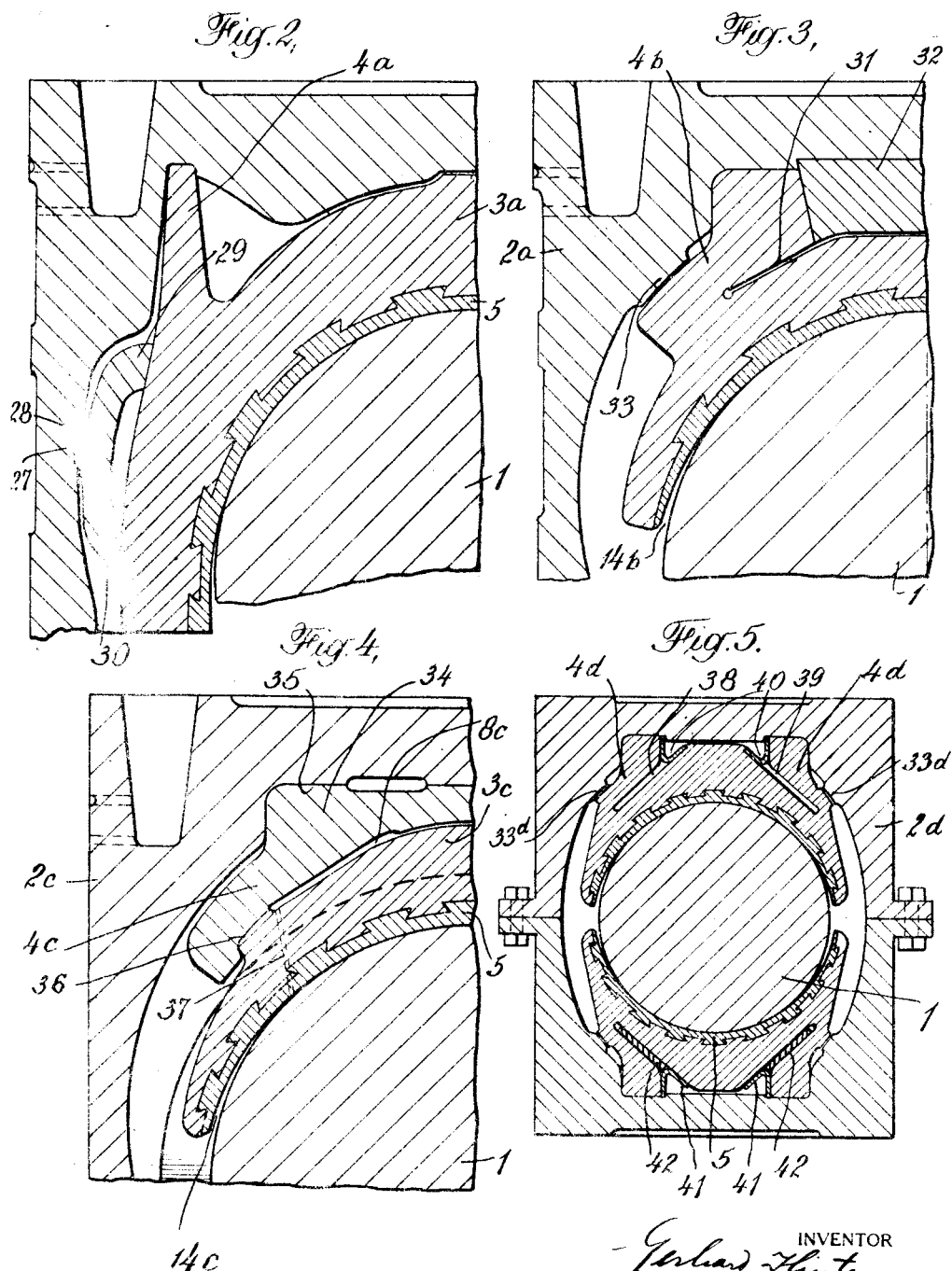

Patented Apr. 3, 1928.

1,664,880

UNITED STATES PATENT OFFICE.

GERHARD FLINTERMANN, OF WEST ORANGE, NEW JERSEY.

JOURNAL BEARING.

Application filed December 24, 1926. Serial No. 156,824.

This invention relates to journal bearings particularly of the heavy duty type used on locomotives, railway cars and the like.

The journal bearings of locomotives are subjected to enormous loads and the "brasses" are severely hammered by the thrust of the pistons. This piston thrust is in a direction that tends to displace the journal in substantially a horizontal plane. The excessive loads have a tendency to squeeze out the lubricant film from the space between the bearing surface and the surface of the journal, resulting in "hot boxes", "burned brasses", etc. The hammering action caused by the pistons tends to deform the bearing surface of the brasses and get it out of shape. This hammering action also results eventually in a disintegration of the brasses.

Heretofore it has been considered advisable to resist or oppose the excessive horizontal thrusts caused by the pistons, by making the bearing quite rigid and by making the brasses of such length that they cover a journal surface of about 180°. In this way the bearing surface extended down a sufficient distance at each side of the journal to rigidly oppose the tendency of the journal to move horizontally. However, this is objectionable for several reasons. For instance, the more rigid the bearing the greater will be the damage done to the brasses in the nature of deformation and disintegration. Moreover, the relatively long bearing surface produces such a long lubricant film that before the lubricant escapes at the far end of the bearing surface its lubricating properties are nearly destroyed, thus allowing objectionable metal to metal contact. The rigidity of the bearing also increases the tendency for the lubricant film to be "squeezed out" during heavy loads. such as overloads.

The main object of this invention is to provide a journal bearing especially designed for use on locomotives, which is capable of handling the heavy normal loads, overloads and piston thrusts without destroying the proper lubricating action and without materially shortening the life of the bearing.

Another object is to provide a journal bearing whose bearing element proper, though rigid in itself, is permitted slight movement to facilitate the formation and maintenance of a wedge-shaped lubricant film under the bearing surface, the instrumentalities for effecting this being very compact and especially designed to fit within the small confines of the usual locomotive journal box shell.

A further object is to provide a journal bearing of greater efficiency and longer life than those now in use and which is simple, compact and relatively inexpensive to manufacture.

The invention is illustrated in the accompanying drawings, in which

Figure 6:
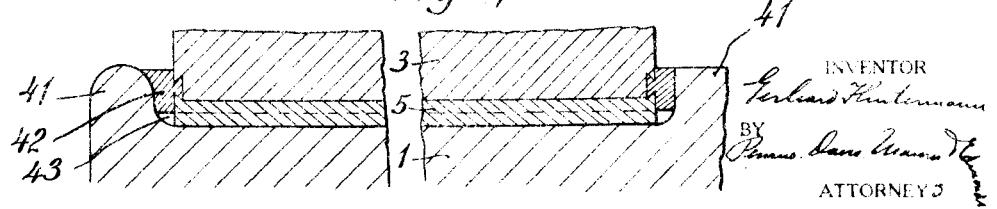

Fig. 1 is a vertical transverse section through a locomotive journal bearing embodying the invention;

Figs. 2 to 5 inclusive illustrate four modifications of the invention, Figs. 2, 3 and 4 being partial transverse sections of journal bearings, and Fig. 5 being a complete transverse section of a journal bearing; and Fig. 6 is a partial longitudinal section of a journal bearing illustrating a desirable addition when any of the journal bearings shown in the other figures is used on a railway car.

Referring first to Fig. 1 the axle journal is represented at 1. It is enclosed by the journal box shell 2 which slides vertically in the customary box slides not shown in the drawing.

The bearing member comprises a bearing element proper or main portion 3, and yielding legs 4. which extend upwardly from points in the vicinity of the ends of the main portion 3.

The inner surface of the portion 3 is made concave to fit the journal surface and may, if desired, be lined with a suitable bearing metal represented at 5. In the form shown in Fig. 1 the legs 4 are integral with the portion 3.

The bearing member is so constructed and designed that for the contemplated loads the main portion 3 will be rigid throughout its length while the legs 4 will yield under the action of certain forces as hereinafter described.

The upper ends of the legs 4 are properly shaped to fit snugly in recesses 7 formed in the journal box shell 2. A clearance 8 is left between the upper wall of the journal box shell and the bearing portion 3 in order to permit of a slight upward movement of the latter. A portion 9 of the journal box shell may act as a stop under some conditions to limit this upward movement of the bearing portion 3.

A clearance 10 at each side of the bearing member permits of a slight sidewise and diagonally-upward movement of the bearing member. A stop 11 at each side of the bearing member abuts against the adjacent wall of the journal box shell after a predetermined slight initial movement of the bearing member. That portion 12 of the wall of the journal box shell adjacent to the stop 11 is designed to flex slightly after the stop 11 abuts against it, if the forces are such as to cause this result. After a certain amount of flexing of the wall of the journal box shell, a second stop 13 comes in contact with the same wall of the journal box shell, and as the wall is somewhat thicker at this point the movement of the bearing member will be opposed to a correspondingly greater degree.

In Fig. 1 the extreme ends of the bearing surface are beveled or cut away as shown at 14. This is for the purpose of providing a clear entrance for the lubricant and also to lessen the length of the actual bearing surface.

In Fig. 1 and the other figures to be hereinafter described the bearing member is preferably made of steel while the lining is preferably bronze, brass, Babbitt metal or the like. If desired the bearing surface may be of the same material as the body of the bearing member in which event the lining would be omitted. In the drawing the lining is dovetailed into the bearing member, but if desired it can be made thicker and forced into place under pressure without the use of dovetails in accordance with the present practice of fastening the brasses in the bearing members of locomotive journal bearings. This practice, however, requires the use of a thicker brass or lining. This would reduce the width of the bearing element and destroy some of its rigidity unless the bearing element is made correspondingly thicker. Therefore, this procedure should only be resorted to where there is sufficient room in the journal box shell to make the bearing element thick enough to preserve its rigidity.

Oil is the preferred form of lubricant, but inasmuch as the present practice in this country is to employ solid lubricant, the journal box shell has been represented in the drawing as having a lubricating cellar of the solid lubricant type. This type of lubricating means comprises a frame 15 designed to receive a grease cake 16 which is pressed against the journal by means of spring 17. A perforated plate 18 is interposed between the grease cake and the journal surface. These parts, as so far described, may be of standard construction. However, as the bearing of this application is designed to permit slight lateral movements of the journal, it is preferable to pivot the frame 15 as shown at 19 and to yieldingly hold the frame in its central position by means of coil springs 20 and 21. The frame 15 may be conveniently pivoted to the removable bottom 22 of the journal box shell and the springs 20 and 21 may react at their lower ends against this removable bottom.

The journal box shell is provided with the usual lubricant reservoirs or pockets 23 and 24 from which lubricant is fed to the slides through ducts 25 and 26 respectively.

Before describing the operation of the bearing it should be borne in mind that the movement of the bearing member to produce the wedge-shaped film of oil, hereinafter described, and the movements of the bearing member caused by the piston thrusts are extremely small. For this reason the gap between the stop 11 and the corresponding wall 12 of the journal box shell is extremely small, so small in fact that in practice these portions would seem to be in actual contact. The gap between the stop 13 and the wall of the journal box shell is slightly larger, but even this gap will be extremely small.

In operation the lubricant forced under the bearing surface by the rotation of the journal will have a tendency to form itself into a wedge-shaped film. One or both of the legs 4 yield slightly so as to permit the main portion 3 of the bearing to shift bodily a small amount to facilitate the formation and maintenance of this wedge-shaped film of oil. The wide end of the wedge-shaped film will be toward the entrance end of the bearing while the thin end of the wedge-shaped film will be toward the exit end of the bearing surface. Of course, the direction of the oil wedge will depend upon the direction of rotation of the journal. The narrow end of the wedge will always point in the direction in which the journal rotates. Excessive loads, such as overloads, will not have a tendency to squeeze out the oil film because the legs 4 will yield under such circumstances to a greater extent and maintain the oil wedge. In some cases the forces which cause the legs 4 to yield will be sufficient to bring one of the stops 11 into operative engagement with the corresponding wall 12 of the journal box shell. Displacement or yielding of the bearing will then be opposed to a correspondingly greater degree because after this action takes place any further movement of the bearing member will have to also deflect the wall of the journal box shell. Displacement of the bearing member is opposed to a still greater degree when one of the stops 13 comes in contact with the wall of the journal box shell. It will, therefore, be seen that the action is a progressive one. First, the legs 4 yieldingly oppose displacement of the bearing member, then this opposition is increased when the yielding portion 12 of the journal box shell comes into play, and the opposing action is still further increased when a thicker part of the wall of the journal box shell comes into play after the stop 13 abuts against this part of the wall. This progressive action can be carried even further by providing more successively acting stops if so desired.

In some cases it might be desirable to have the stop 11 in actual engagement with the wall of the journal box shell, even from the beginning. In this case the legs 4, while permitting movement of the bearing portion 3, need not play an important part in yieldingly opposing such movement because the wall of the box shell may be the controlling opposing member from the start.

The bearing member yields in substantially the same way in cushioning and yieldingly opposing the piston thrusts. The legs 4 will yield slightly to permit of a minute lateral shifting of the bearing member in response to a piston thrust in either direction. If the thrust is great enough the stop 11 abuts against the wall of the box shell. This wall will then slightly flex but the opposition to displacement of the bearing member will be increased. When the stop 13 abuts against the wall of the box shell the opposition to displacement or yielding of the bearing member has reached the maximum. So far as the piston thrusts are concerned the most desirable arrangement is to have the stop 11 in actual contact with the wall of the box shell from the start, as described above. The piston thrust will then be yieldingly opposed by the box shell wall from the start and any knocking which might result from the stop 11 coming in contact with the wall will thereby be eliminated.

It will be seen that the bearing surface does not have to be as long as those in use on locomotives at the present time because the bearing is not designed to rigidly oppose the piston thrusts but to yieldingly absorb them. This shortens the length of the oil film and insures that its lubricating properties are not destroyed. The yielding of the bearing member not only permits the ready formation of the oil wedge but it insures that during overloads, shocks, etc. the oil wedge will not be destroyed.

The yielding absorption of the piston thrusts and any other shocks, jolts, etc. tends to eliminate vibration of the journal such as often occurs in bearings as heretofore constructed. The hammering action referred to above as occurring in the present day locomotive journal bearings is eliminated and the shape of the bearing surface is preserved.

In Fig. 2 the bearing member 3ª is provided with yielding legs 4ª the construction and function of which are, in general the same as in Fig. 1. In this figure as well as in Figs. 3 and 4 it will be understood that the parts shown are duplicated at the right of the figure in each instance. In the modification of Fig. 2 a spring member 27 is interposed between the side of the bearing member and the adjacent wall of the box shell. This spring member is fulcrumed on the box shell wall at 28 and has two oppositely extending legs 29 and 30 which bear against the bearing member. Displacement of the bearing both by the piston thrusts and by the lubricant wedge is therefore yieldingly opposed by the legs 4ª, by the spring members 27 and by the yielding walls of the box shell. By properly designing these parts the opposition to the force tending to displace the bearing may progressively increase as the displacing force increases.

Figs. 3 and 4 represent journal bearings which are better adapted for more general use. In Fig. 3 the legs 4ᵇ are formed by providing the bearing member with slots 31 which may be made by means of a saw or in any other convenient way. The legs 4ᵇ, as well as the entire bearing member, is held in place by a wedge member 32. In this form of the bearing the legs 4ᵇ yield to permit the formation and maintenance of the lubricant wedge. A stop 33 on the housing 2ª limits the extent to which the corresponding leg can yield. When this type of bearing is used as a locomotive journal bearing the legs 4ᵇ alone are depended upon to yieldingly resist and absorb the piston thrusts. The bevel at each end of the bearing surface shown at 14ᵇ extends upwardly a greater distance in the case of Fig. 3 than in the case of Fig. 1, thus shortening the length of the effective oil wedge.

In Fig. 4 the yielding legs represented at 4ᶜ are formed separately from the main portion 3ᶜ of the bearing. They are formed integral with a cross piece 34 which fits snugly in a recess 35 in the housing 2ᶜ. The legs 4ᶜ bear on projections 36 formed on the bearing portion 3ᶜ and yield to allow the formation and maintenance of the lubricant wedge as described in connection with Fig. 3. If desired lubricant ducts 37 may extend from the clearance 8ᶜ (between the legs and bearing portion 3ᶜ) to a point near the end of the clearance 14ᶜ formed by bevelling the bearing surface. These auxiliary ducts insure an ample supply of lubricant at the entrance end of the bearing surface.

The bearings of Figs. 3 and 4 are well adapted for use on railway cars, where the piston thrusts described above are not encountered.

Fig. 5 shows a journal bearing adapted for use on machinery of various kinds. Here as in Fig. 3 the yielding legs 4ᵈ are integral with the main portion 3ᵈ of the bearing and may be formed by slotting the bearing member at 38 and 39. The legs 4ᵈ yield to permit the formation and maintenance of a lubricant wedge as described above and the yielding action of the legs is limited by stops 33ᵈ on the housing 2ᵈ. In this form of the bearing, angle-shaped springs 40 may be employed if desired, each of which has a leg 41 tending to press the bearing member toward the journal and thereby yieldingly oppose movement of the bearing member away from the journal. Movement of the bearing member is therefore yieldingly opposed, not only by the legs 4ᵃ but also by these springs. In Fig. 5, the bearing member is substantially duplicated at the lower half of the journal. As the lower half of the bearing takes most of the load in this type of bearing it may be desirable to fill the lower slots 38 and 39 with strips 42 of brass or other relatively soft metal which will reinforce or add to the yielding opposition furnished by the yielding legs. In other words, the brass strips make the bearing member less yielding.

Fig. 6 is a partial longitudinal section of that type of journal usually employed on railway cars. The journal has a circumferential groove which leaves upstanding shoulders 41 between which the "brass" operates. In the usual construction any longitudinal movement or vibration of the journal causes the shoulders 41 to deform the bearing surface because of displacement or "flowing" of the material of the "brass". When any of the improved bearings disclosed above is used on a railway car it is desirable to insert between each shoulder 41 and the end of the bearing lining 5 a separate piece of bearing metal 42 in such a way that a clearance 43 is left. When the journal vibrates or moves longitudinally the metal of the separate piece 42 flows into the clearance 43 without displacing the metal of the main lining and destroying the shape of its bearing surface. One of the main objects in devising the bearings herein disclosed, namely prevention of distortion of the bearing surface, is therefore still further carried out by this added improvement when the bearings are used on railway cars or in other relations where the journal is of that character shown in Fig. 6.

In the foregoing description only certain forces which tend to cause the bearing member to be displaced have been specifically mentioned. Various other forces will no doubt be encountered but practically all of them will be yieldingly absorbed and dissipated by the means herein disclosed. For instance, certain forces are set up in the bearing during braking and these are yieldingly absorbed and dissipated in the improved bearings without breaking up the lubricant wedge or injuring the bearing surface.

As stated above all of movements of the bearing member which takes place during the yielding absorption of the shocks, thrusts, etc., and during the formation and maintenance of the lubricant wedge are extremely small ones—sometimes microscopic. Therefore when it is desirable to make the side walls of the box shell or housing flexible, only a microscopic flexure may be necessary.

In any of the bearings described above the various parts, such as the bearing member proper, longitudinally extending springs, etc. may be divided transversely into any desired number of sections.

The particular shape of the main portion of the bearing member and the yielding legs shown in the drawings, adds to the rigidity of the main portion of the bearing and causes the proper distribution of the stresses in both the main portion of the bearing and the yielding legs.

The principles herein described may also be applied to ball bearings and roller bearings.

I claim:

1. A journal bearing comprising a journal, a housing, a bearing member interposed between the journal and the housing and comprising a rigid main portion having a bearing surface fitting a portion of the surface of the journal and a yielding supporting leg near each end of the rigid main portion adapted to permit slight displacement of said rigid main portion, the sides of the bearing member being adapted to abut against the adjacent walls of the housing, said walls of the housing being flexible to yieldingly oppose movement of the bearing member.

2. A journal bearing comprising a journal, a housing, and a yieldingly mounted bearing member located in the housing and having a bearing surface fitting a portion of the journal surface, the sides of the bearing member being adapted to abut the adjacent walls of the housing, and said walls of the housing being flexible to yieldingly oppose movement of the bearing member.

3. A journal bearing comprising a journal, a housing, a bearing member interposed between the journal and the housing and comprising a rigid main portion having a bearing surface fitting a portion of the surface of the journal and a yielding supporting leg near each end of the rigid main portion adapted to permit slight displacement of said rigid main portion, and at least one element at each side of the bearing member adapted to yieldingly oppose movement of the bearing member.

4. A journal bearing in accordance with claim 3 in which said element at each side of the bearing member comprises a wall of the housing, said wall being made flexible for the purpose described.

5. A journal bearing comprising a journal, a housing, a yieldingly mounted bearing member located in the housing and having a bearing surface fitting a portion of the surface of the journal, the walls of the housing at the sides of the bearing member being flexible and the bearing member having portions at each side adapted to come into contact with the corresponding housing wall successively for the purpose described.

6. A journal bearing comprising a journal, a housing, a bearing member interposed between the journal and the housing and comprising a rigid main portion having a bearing surface fitting a portion of the surface of the journal and a yielding support-leg near each end of the rigid main portion adapted to permit slight displacement of said rigid main portion, a portion at each side of the bearing member being adapted to abut against the corresponding wall of the housing after a predetermined slight movement of the bearing member.

In testimony whereof I affix my signature.

GERHARD FLINTERMANN.